United States Patent [19]

Rossignol

[11] Patent Number: 5,452,699
[45] Date of Patent: Sep. 26, 1995

[54] METHOD AND DEVICE FOR DETECTING MISFIRES OF THE AIR/FUEL MIXTURE FEEDING AN INTERNAL COMBUSTION ENGINE PROPELLING A MOTOR VEHICLE AND THEIR APPLICATIONS

[75] Inventor: Alain Rossignol, Toulouse, France

[73] Assignee: Siemens Automotive S.A., Toulouse Cedex, France

[21] Appl. No.: 211,782

[22] PCT Filed: Oct. 13, 1992

[86] PCT No.: PCT/EP92/02353

§ 371 Date: May 13, 1994

§ 102(e) Date: May 13, 1994

[87] PCT Pub. No.: WO93/08395

PCT Pub. Date: Apr. 29, 1993

[30] Foreign Application Priority Data

Oct. 16, 1991 [FR] France ................................ 91 12743

[51] Int. Cl.$^6$ .................................................. F02D 41/22
[52] U.S. Cl. ........................................ 123/481; 73/117.3
[58] Field of Search ................................... 123/479, 481, 123/436; 73/117.3, 116

[56] References Cited

U.S. PATENT DOCUMENTS

| | | | |
|---|---|---|---|
| 4,513,721 | 4/1985 | Ina et al. | 123/478 |
| 5,035,220 | 7/1991 | Uchinami et al. | 123/481 |
| 5,216,915 | 6/1993 | Sakamoto | 73/117.3 |
| 5,231,869 | 8/1993 | Klenk et al. | 73/116 |
| 5,263,453 | 11/1993 | Wakahara et al. | 123/481 |
| 5,357,790 | 10/1994 | Hosoya | 123/436 |

OTHER PUBLICATIONS

Patent Abstract of Japan, vol. 5, No. 84 (P-64) Jun. 2, 1981 & Jp-A-56 033 514 (Nippon) Apr. 4, 1981.
Patent Abstract of Japan, vol. 7, No. 173 (M-232) Jul. 30, 1983 & JP-A-58 077 126 (Nippon) May 10, 1983.
Patent Abstract of Japan, vol. 7, No. 257 (M-256) Nov. 16, 1983 &JP-A-58 140 449 (Nippon) Aug. 20, 1983.
Patent Abstract of Japan, vol. 8, No. 16 (M-270) Jan. 24, 1984 & JP-A-58 176 469 (Nippon) Oct. 15, 1983.
Patent Abstract of Japan, vol. 12, No. 212 (M-710) Jun. 17, 1988 & JP-A-63 016 153 (Mazda) Jan. 23, 1988.
Patent Abstract of Japan, vol. 14, No. 307 (M-993) Jul. 3, 1990 & JP-A-20 99 742 (Mitsubishi) Apr. 1990.
Patent Abstract of Japan, vol. 15, No. 329 (M-1149) Aug. 21, 1991 & JP-A-31 24 969 (Nippon) May 28, 1991.

Primary Examiner—Andrew M. Dolinar
Attorney, Agent, or Firm—Herbert L. Lerner; Laurence A. Greenberg

[57] ABSTRACT

The dynamic behaviour of the engine (1) is monitored and the existence of misfires is deduced from the detection of irregularities in this behaviour induced by these misses. According to the invention, forces transmitted between the engine (1) and the chassis (2) of the vehicle in which it is installed are sensed, the amplitude of these forces is compared to a predetermined threshold value, from the exceeding of this threshold the application to the engine of external forces is deduced and the detection (8) of possible misfires is inhibited when these external forces are applied to the engine (1) when the load of the latter is lower than a predetermined load value. Application is to the protection of a catalytic converter.

12 Claims, 1 Drawing Sheet

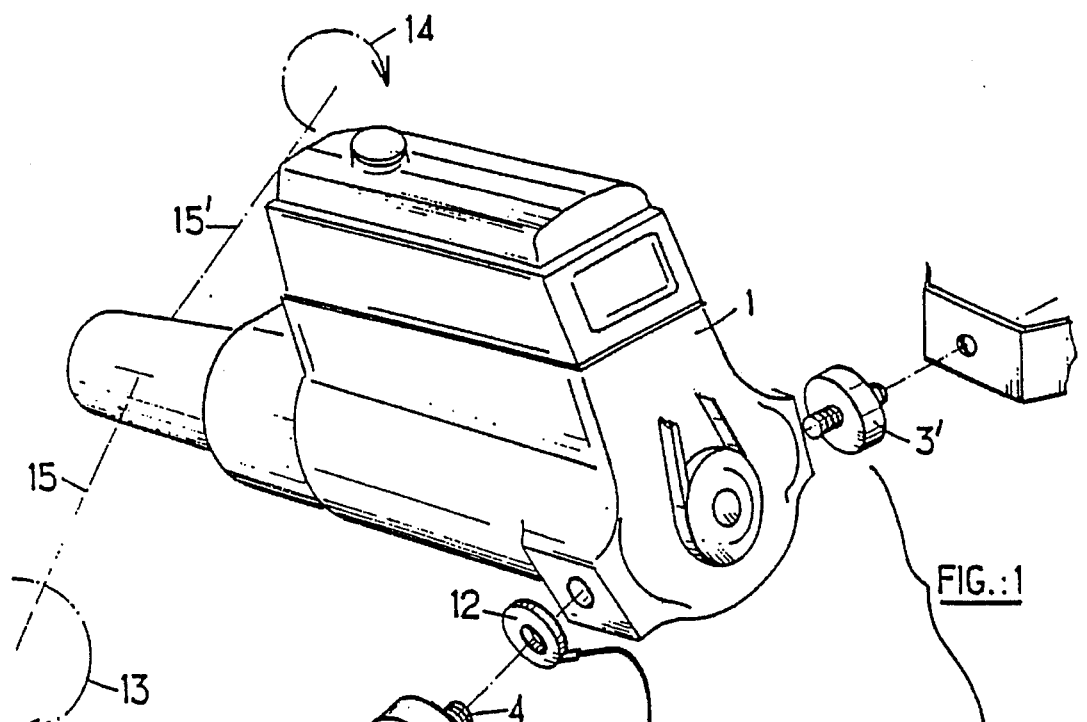
FIG.:1
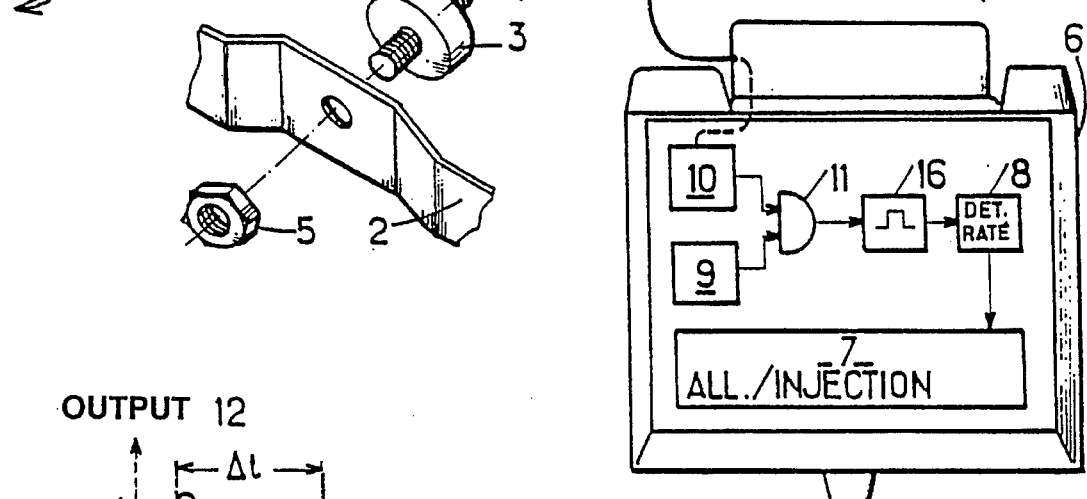
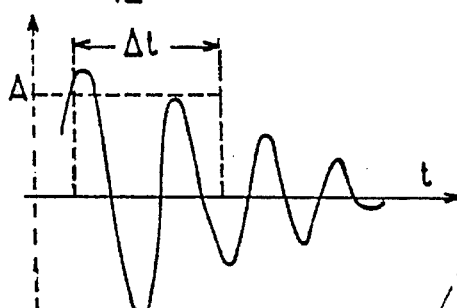
FIG.:2
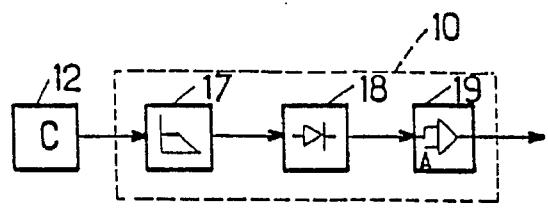
FIG.:3

METHOD AND DEVICE FOR DETECTING MISFIRES OF THE AIR/FUEL MIXTURE FEEDING AN INTERNAL COMBUSTION ENGINE PROPELLING A MOTOR VEHICLE AND THEIR APPLICATIONS

The present invention relates to a method and a device for detecting misfires in an internal combustion engine. More particularly, the present invention also relates to an application of such a method and of such a device to the prevention of degradation of a "catalytic" converter for oxidising the exhaust gases of the engine.

Misfires in an internal combustion engine reveal various disorders which can affect either means dedicated to the igniting of the air/fuel mixture (coils, spark plugs, shortcircuits in the feed lines, etc.) or means for composing the said mixture (carburettor, injector). Means for detecting such misfires are thus useful so as to correct these disorders by cleaning, regulating or replacing the defective components.

Increasingly strict legislation concerning air pollution further leads to considering installing such detection means for other purposes. In fact, the catalytic converters used for oxidising or reducing the exhaust gases of an engine are themselves liable to be degraded by injections of unburnt fuel. In particular, when there is a misfire in one cylinder of the engine, the fuel of the mixture introduced into the cylinder then passes directly into the catalytic converter where it burns by catalysis thereby deteriorating the costly catalyst contained in this converter. Such injections of fuel thus considerably reduce the efficiency of the catalyst in its conversion of the exhaust gases, hydrocarbons, oxides of carbon, oxides of nitrogen, etc. into less pollutant oxides. It is thus appropriate to protect the catalyst from such injections of unburnt fuel, by cutting off, for example, the supply of a fuel injector when misfires have been detected in one cylinder of an engine.

In order to detect such misfires, the document WO 90/02871 proposes the monitoring of the movements of the engine block using an accelerometer sensor for example, sensitive to the oscillations of the oscillatory system composed of the engine and of its elastic means for mounting onto the chassis of a motor vehicle. In the event of missed combustion in one of the cylinders of the engine, the oscillation of the system becomes irregular. A measurement of the phase shift between an acceleration peak and the moment when ignition sparks are emitted enables the cylinders when there has been a misfire to be identified.

The document U.S. Pat. No. 4,930,479 also proposes the monitoring of the variations of the rotational speed of the engine, between predetermined points of the engine cycle, so as to identify possible misfires responsible for abnormal variations of this speed.

The detection methods described in these documents and in other documents of the prior art give satisfactory results under high engine load. In contrast, at low loads, they become sensitive to external disturbances. When the engine is used to propel a motor vehicle, these external disturbances may consist in passing over obstacles on the roadway, such as potholes for example, of changes in speed, etc.

These disturbances apply jolts to the vehicle in general and to the engine in particular. When the detection of misfires is founded upon the detection of jolts, as in the detection methods currently known, the jolts of origin external to the engine may be falsely attributed to misfires and give rise to non-justified cutoffs of the supply of fuel to a cylinder, for example.

The document JP A 63-16153 discloses a system in which the forces transmitted between the engine and the chassis are sensed by two pressure sensors associated with the engine mounts. The difference between the variations of forces measured by the two sensors is used to detect misfires. Said difference is low when the variation of forces is caused by the raggedness of the road surface. However, such a system is not very reliable because false detection of misfires can occur by sudden acceleration changes, caused for example by braking or cornering depending on the position of the engine, and expensive, because of the need of two sensors.

The objective of the present invention therefore is to provide a method and to produce a device for detecting misfires which does not exhibit this drawback.

This objective of the invention as will as others which will emerge upon reading the description which follows is achieved with a method for detecting misfires of the air/fuel mixture feeding an internal combustion engine propelling a motor vehicle, according to which the dynamic behaviour of the engine is monitored and the existence of such misfires is deduced from the detection of irregularities in this behaviour induced by these misses. According to the invention, forces transmitted between the engine and the chassis of the vehicle in which it is installed are sensed, the amplitude of these forces is compared to a predetermined threshold value, from the exceeding of this threshold the application to the engine of external forces is deduced and the detection of possible misfires is inhibited when these external forces are applied to the engine when the load of the latter is lower than a predetermined load value.

By thus inhibiting, at low loads, any detection of misfires if the external disturbances are liable to make this detection false, undue cutting off of the supply to one or more cylinders of the engine so as to protect a catalytic converter placed in the exhaust pipe of this engine, is avoided.

In order to implement this method, the invention provides a device comprising means for detecting misfires and means for measuring the load of the engine. According to the invention, the device further comprises means for measuring forces transmitted between the engine and the chassis of the vehicle and means for processing signals provided by the means for measuring these forces so as to inhibit the means for detecting misfires when the amplitude of the transmitted forces exceeds a predetermined threshold value when the measured load of the engine is lower than a predetermined load value.

The means for measuring the forces transmitted between the engine and the chassis may consist of a piezo-electric sensor, an accelerometer or a strain gauge for example. According to a preferred embodiment of the invention, this sensor consists of a piezo-electric sensor mounted between the engine and the chassis, in the region of an elastic block for mounting the engine onto this chassis.

Other characteristics and advantages of the present invention will emerge upon reading the description which follows and upon examining the appended drawing in which:

FIG. 1 is a diagrammatic perspective view of an internal combustion engine mounted on the chassis of a motor vehicle, this engine being equipped with the device according to the present invention, FIG. 2 is a time graph of the output signal of a force sensor used in the present invention, and FIG. 3 is a flow diagram of the means for processing the signal represented in FIG. 2, incorporated in the device according to the invention.

The engine 1 represented in FIG. 1 is conventionally mounted on the chassis 2 of a motor vehicle, via elastic blocks 3, 3' commonly called "silent blocks", using a bolt 4 and a nut 5. Such an engine today is often controlled by electronics enclosed in a box 6 and designed essentially to control the ignition and/or injection of fuel in the cylinders of the engine. This ignition and/or injection control function has been diagrammatically represented by a block 7.

When the exhaust pipe of the engine is equipped with a catalytic converter (not represented), it is appropriate, as has been seen above, to prevent unburnt fuel in the cylinders of the engine from coming to burn in the converter thereby deteriorating the catalyst which is contained therein, this catalyst being commonly constituted by a precious metal such as platinum which renders such a converter expensive.

In order to do this, the box 6 Comprises means for detecting misfires, diagrammatically represented in the form of a block 8. These means may be constituted by any one of the means known for this purpose, such as those described in the preamble of the present description and, more generally, by any device sensitive to irregularities in operation of the engine caused by misfires.

As has been seen above, the means known for this purpose are not satisfactory at low loads of the engine, when the latter then develops a low torque, because the action of external disturbances on the dynamic behaviour of the engine may then be confused with that of misfires.

According to the present invention, this difficulty is overcome by detecting the action of possible external disturbances on the engine itself and then in inhibiting the means for detecting misfires if these disturbances intervene whilst the engine is under low load.

In order to do this the device according to the invention comprises means 9 for measuring the load of the engine, integrated with the electronics protected by the box 6, these means emitting a signal when the value of this load is lower than a predetermined threshold value, below which tests have shown that the engine should be considered as "under low load" in the sense of the present invention. By way of a nonlimiting example, this threshold value may be fixed to one third of the maximum torque which the engine can develop. As is well known, the torque delivered by the engine may be evaluated with the aid of the signal provided by a sensor of the position of a butterfly for the gases of the engine or by a pressure sensor in the inlet manifold of this engine, for example.

A low load situation of the engine thus being able to be perceived, it is also necessary, according to an essential characteristic of the present invention, to detect the application to the vehicle in general and to the engine in particular, of forces of external origins liable to disturb the process for detecting misfires.

In order to do this, according to a preferred embodiment of the device according to the present invention, a load sensor or strain sensor 12 is arranged between one 3 of the silent blocks and the casing of the engine, so that this sensor is sensitive to any force to which the engine is subjected and which is transmitted to the chassis through the silent block.

Such a force may result for example from the passage of one of the drive wheels 13, 14 of the vehicle over a pothole or other irregularity of the surface of the roadway, which passage induces the application of an impulsive force in the corresponding transmission shaft 15, 15' connected to the output shaft of the engine, whose casing reacts to this jolt by transmitting to the silent block 3 at least a part of the force received from the shaft 15. From this there results a variation in the compression of the strain sensor 12, pinched between the silent block 3 and the casing of the engine 1, and the production of an electrical signal at the output of the sensor, which signal is delivered to the means 10 for detecting the forces transmitted between the engine and the chassis of the vehicle via the silent block 3.

Other causes external to the engine may give rise to the transmission of forces between this engine and the chassis which supports it, such as for example a manual or automatic change in gear ratio of a Gear box associated with the engine.

By way of nonlimiting example, the strain sensor or force sensor 12 may consist of a piezo-electric sensor sold under reference TK903E by the Japanese company NGK SPARK PLUG Co., which assumes the shape of a washer (see FIG. 1) to be centred on the bolt 4. The piezo-electric washer is prestressed by adequate tightening of the nut 5. The prestress in the piezo-electric washer may be limited by a shoulder of predetermined height which limits the crushing of the washer thereby fixing the prestress to a value determined by the difference between the height of the shoulder and the thickness of the washer. A variation of the resultant torque on one of the transmission shafts 15, 15', due to an external impulsive force applied to one wheel 13, 14 respectively for example, then gives rise to a variation in the compression of the sensor 12 and a corresponding fluctuation of the output signal of this sensor, which may assume the form represented in FIG. 2. Of course, it is necessary to avoid taking into consideration fluctuations of this signal which would be representative of natural fluctuations of the torque delivered by the engine, which fluctuations are due to the discontinuous character of the explosions of the air/fuel mixture in the cylinders of the engine. In order to do this the signal delivered by the sensor is only taken into consideration when its amplitude exceeds a predetermined threshold A below which the fluctuations do not correspond to external disturbances. Means 10 for processing the signal emitted by the sensor 12 are provided for this purpose.

When the signal delivered by the sensor 12 exceeds the threshold A, the detection of misfires is inhibited during a predetermined time interval $\Delta t$, after which the process of comparing the signal to the threshold A may be resumed so as possibly to inhibit once again the detection of misfires, if the inhibition conditions persist (engine under low load, presence of external disturbances). The combination of these conditions is illustrated diagrammatically in FIG. 1 by the presence of a logic AND gate 11 whose inputs are fed by the means 9 and 10. A monostable latch 16 interposed between the gate 11 and the means 8 for detecting misfires ensures inhibition of these means during a time interval At when the inhibition conditions are both present. The duration of this time interval may be adjusted by the man skilled in the art to the particular vehicle and to the engine equipped with the device according to the present invention. Tests have shown, for a particular vehicle, that a value $\Delta t=0.5$ s proved suitable.

As illustrated in FIG. 3, the means 10 for processing the signal emitted by the sensor 12 may comprise a low-pass filter 17 suitable for ridding the signal of parasitic high-frequency fluctuations, a rectifier 18 and a comparator 19 of the signal to the threshold A.

It now appears that the present invention enables the objective fixed to be attained, namely to prevent an untoward cutoff of the supply of fuel of an internal combustion engine whose exhaust pipe is equipped with a catalytic converter, due to a false detection of misfires under low load of the engine.

Of course the invention is not limited to the embodiment described and represented which has been given solely by way of example. Thus, sensors other than a piezo-electric sensor could be used, such as an accelerometer or a strain gauge for example. Sensors sensitive to the movements of the engine relative to the chassis could also be used in the place of the sensors of forces transmitted between the engine and the chassis. Likewise, the position of the sensor could be different from that represented in FIG. 1, which is suitable for an engine arranged along the longitudinal axis of the vehicle, as represented in the Figure. Of course the invention also applies to a vehicle equipped with a transverse engine, with a suitable adaptation of the position of the sensor, suitable for allowing the detection of forces of origin external to the engine and transmitted between the latter and the chassis of the vehicle.

LIST OF NUMERICAL REFERENCES USED

Transmission shafts 15, 15'
Monostable latch 16
Block 7
Elastic blocks 3, 3'
Box 6
Bolt 4
Strain sensor 12
Chassis 2
Comparator 19
Nut 5
Low-pass filter 17
Time interval ($\alpha t$)
Engine 1
Means for measuring load 9
Means for processing 10
Means for detecting misfires 8
Logic AND gate 11
Rectifier 18
Drive wheels 13, 14
Threshold A

I claim:

1. A method for detecting misfires in an internal combustion engine propelling a motor vehicle, wherein the internal combustion engine is installed in a chassis of the motor vehicle, the method which comprises:

monitoring a dynamic behavior of an internal combustion engine of a motor vehicle for irregularities in the dynamic behavior;

deducing that misfire has occured in the engine when irregularities in the dynamic behavior are detected; sensing a force transmitted between a chassis and the engine, determining an amplitude of the force, and defining a first condition in which the amplitude of the force exceeds a predetermined threshold amplitude;

monitoring a load of the engine and defining a second condition in which the load of the engine is lower than a predetermined load value;

prohibiting the deducing step if the first condition and the second condition are satisfied.

2. The method according to claim 1, which further comprises prohibiting the deducing step during a predetermined time interval starting at a moment at which the force transmitted between the engine and the chassis of the motor vehicle first exceeds the predetermined threshold amplitude.

3. The method according to claim 1, which further comprises forming a signal representative of the force transmitted between the engine and the chassis with a sensor, and processing the signal by low-pass filtering and rectifying before comparing an amplitude of the processed signal with the predetermined threshold amplitude.

4. A device for detecting misfires in an internal combustion engine propelling a motor vehicle, wherein the engine is installed in a chassis of the motor vehicle, the device comprising:

misfire detecting means for detecting misfires of an internal combustion engine of a motor vehicle;

load measuring means for measuring a load of the engine;

measuring means for measuring forces transmitted between the engine and a chassis of the motor vehicle and for providing signals representative of an amplitude of the forces;

signal processing means connected to said measuring means and to said misfire detecting means for processing the signals provided by said measuring means and for inhibiting said misfire detecting means when, in combination:

a) the amplitude of the forces transmitted between the engine and the chassis exceeds a predetermined threshold amplitude and, b) a measured load of the engine is lower than a predetermined load value.

5. The device according to claim 4, wherein said measuring means are in the form of a piezo-electric sensor.

6. The device according to claim 5, wherein the engine is mounted to the chassis by means of an elastic engine mount, and said piezo-electric sensor is mounted between the engine and the chassis in the region of the elastic engine mount.

7. The device according to claim 4, wherein said measuring means are in the form of an accelerometer.

8. The device according to claim 4, wherein said measuring means are in the form of a strain gauge.

9. The device according to claim 4, wherein said load measuring means are means for measuring a torque developed by the engine.

10. The device according to claim 4, wherein said load measuring means include a sensor for sensing a position of a butterfly for the gases of the engine.

11. The device according to claim 4, wherein said load measuring means include a sensor for sensing a pressure in an inlet manifold of the engine.

12. The device according to claim 4, wherein the motor vehicle includes an engine control, said engine control cutting off a fuel supply to one cylinder of the internal combustion engine, upon detecting at least one misfire.

* * * * *